April 17, 1934.  W. H. LEVERETT  1,954,879
PROCESS OF RAISING THE SULPHUR DIOXIDE CONTENT OF A GAS
Filed Feb. 24, 1931
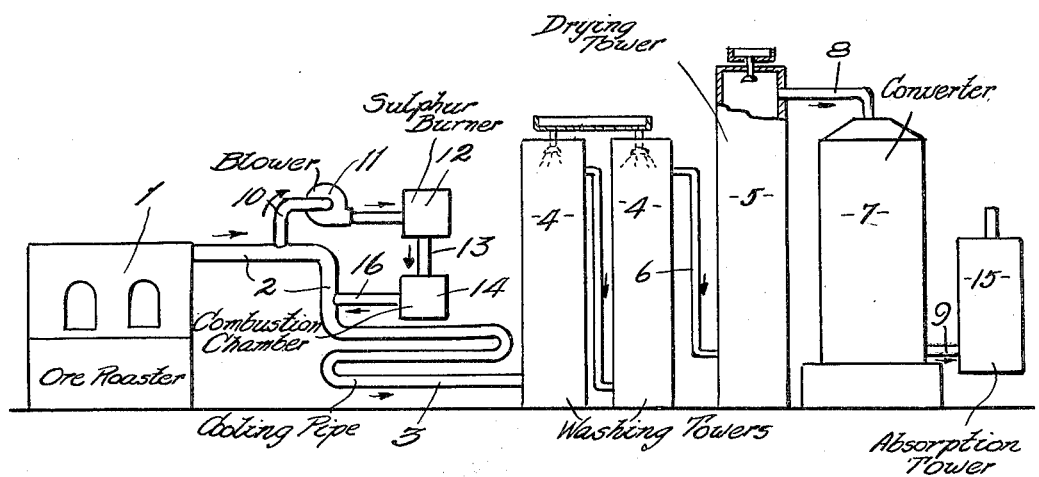
INVENTOR,
Warren H. Leverett.
BY
ATTORNEYS.

Patented Apr. 17, 1934

1,954,879

UNITED STATES PATENT OFFICE 1,954,879

PROCESS OF RAISING THE SULPHUR DIOXIDE CONTENT OF A GAS

Warren H. Leverett, Bartlesville, Okla., assignor to National Zinc Company, Inc., New York, N. Y., a corporation of New York Application February 24, 1931, Serial No. 517,789

5 Claims. (Cl. 23—180)

This invention relates to improvements in the process of manufacturing sulphuric acid by the well known "contact" process and especially to the enriching of the gases produced by the burning of iron pyrites, zinc ores or other sulphur bearing ores, with sulphur dioxide before they are passed into the contact chamber.

It is generally known in the art that the percentage of sulphur dioxide in the gas produced by the roasting of pyrites in many instances has too low a percentage of sulphur dioxide content to effect an economical production of sulphuric acid, and this is especially true in the contact process in which a concentrated sulphuric acid is to be produced.

The present invention relates particularly to improvements in the process of making sulphuric acid by the "contact" process, although it is equally applicable to the "chamber" process, and consists in shunting a portion of the gases produced by burning pyrites, zinc ore, roaster gas or copper converter gas through a sulphur burner in which sulphur is being burned, thereby producing a resultant gas of relatively high sulphur dioxide content, which is then mixed with the remaining pyrite gas, thereby increasing the percentage of sulphur dioxide in the gases to be used in the reaction chambers, without increasing the volume of such gases.

The drawing is a diagrammatical view of a device used in the manufacture of sulphuric acid by the "contact" process and embodies a device suitable for carrying out the improvement of the present invention.

In the drawing, 1 is a burner or ore roaster in which a sulphide such as iron pyrites, zinc ore or other sulphur bearing ores are burned to produce a gas containing among other gases, sulphur dioxide and oxygen; 2 is a conduit through which the gases pass from the burner to the lead cooling pipes 3, which in turn communicate with the washing towers 4. The drying tower 5 is connected by conduit 6 with the washing towers 4, and with the converter 7 which contains the contact mass and which may be equipped either with a preheater or heat exchanger.

The preheater or heat exchanger is not shown in the drawing, and drying tower 5 is connected with converter 7 by conduit 8. The usual absorbtion tower 15 is connected with converter 7 by pipe 9. The structure just described is well known in the art and it is the object of the present invention to increase the percentage of sulphur dioxide in the gases issuing from the ore roaster without increase of volume, which is accomplished in the following manner: Conduit 10 in which a blower 11 of any suitable type is positioned communicates with conduit 2 and with the primary sulphur burner 12. A fractional part of the gases, containing sulphur dioxide and oxygen, produced in the ore roaster, is passed through the primary sulphur burner 12, wherein the oxygen and sulphur unite to form sulphur dioxide, thereby producing a gas having a larger percentage of sulphur dioxide and a lower percentage of oxygen than the gas produced by the ore roaster, the latter gas containing from three percent to six percent of sulphur dioxide. The percentage of sulphur dioxide of the resultant mixture may in this manner be increased to any desired percentage up to approximately 17 percent, which under most conditions is higher than is required for the most economical operation of the process. This enriched gas passes from 12 through pipe 13 into a combustion chamber 14 which completes the combustion and then passes through pipe 16 back into conduit 2 where it mixes with the remaining portion of the burner gases, thereby increasing the percentage of sulphur dioxide of the entire amount of gas to a point where an economical production of sulphuric acid of high concentration may be obtained.

With this apparatus and method of enriching the sulphur dioxide content of the gases the total volume of gases is not increased, due to the fact that the oxygen contained within the gases issuing from the pyrite burner, zinc ore roaster or copper converter, which may be about 15 percent, unites with the sulphur in the sulphur burner to form sulphur dioxide and decreases the oxygen content of the resultant gases, without increasing the volume but with an increase in weight. Where the primary sulphur burner chamber is of sufficient capacity to insure complete combustion it will not be necessary to pass the gases into the combustion chamber 14 before passing them back into the conduit 2. The only increase in volume of the gases during this step of enrichment of sulphur dioxide would be due to the heat of combustion which could be readily dissipated in the shunt passageway.

It is apparent that the device shown and described is of the simplest form and might be altered by adding a dust chamber, testing box, etc., without affecting the usefulness of the present invention. Furthermore, it is desired not to limit this invention to the introduction of an enriching supply of sulphur dioxide to any particular section of the device, but only that it be placed between the pyrite chamber and the contact chamber.

What I claim as new and desire to secure by Letters Patent is:

1. In the manufacture of sulphuric acid by the contact process, the improvement which consists; in passing a portion of the gases produced by the pyrite burner through a primary sulphur burner closed to the atmosphere, wherein sulphur is being burned by uniting with the oxygen of said gases, then passing the resultant gases back into the remaining gases produced by the pyrite burner before they reach the contact chamber.

2. In the manufacture of sulphuric acid by the contact process wherein pyrites are burned to produce a gas containing sulphur dioxide and oxygen, the improvement which consists in shunting a portion of said pyrite burner gas through a primary sulphur burner which is closed to the atmosphere wherein sulphur is burned, then mixing the resultant gas from said primary sulphur burner with the remaining portion of said pyrite burner gas whereby the sulphur dioxide content of all the pyrite burner gas is increased.

3. In the manufacture of sulphuric acid by the contact process wherein pyrites are burned to produce a gas containing sulphur dioxide and oxygen, the improvement which consists in forcing a portion of said pyrite burner gas through a primary sulphur burner in the absence of additional air wherein sulphur is burned, then passing the resultant gas from said primary sulphur burner into the remaining portion of the pyrite burner gas, whereby the sulphur dioxide content of all the pyrite burner gas is increased.

4. In the manufacture of sulphuric acid by the contact process wherein pyrites are burned to produce a gas containing sulphur dioxide and oxygen, the improvement which consists in passing a portion of said pyrite burner gas through a primary sulphur burner in the absence of additional air wherein sulphur is burned, then passing the resultant gas from said sulphur burner into the remaining portion of the pyrite burner gas, whereby the sulphur dioxide content of all the pyrite burner gas is increased without increasing its volume.

5. In the manufacture of sulphuric acid by the contact process wherein pyrites are burned to produce a gas containing sulphur dioxide and oxygen, the improvement which consists in passing a portion of said pyrite burner gas through a sulphur burner in the absence of additional air wherein sulphur is burned; then passing the gases from said sulphur burner through a combustion chamber, then passing the resultant gases from said combustion chamber into the remaining portion of the pyrite burner gas, whereby the sulphur dioxide content of all the pyrite burner gas is increased.

WARREN H. LEVERETT.